United States Patent
Lesnau, IV

(10) Patent No.: US 9,970,548 B2
(45) Date of Patent: May 15, 2018

(54) MULTI-LAYER GASKET

(71) Applicant: Federal-Mogul Corporation, Southfield, MI (US)

(72) Inventor: Edward Lesnau, IV, Livonia, MI (US)

(73) Assignee: Federal-Mogul LLC, Southfield, MI (US)

( * ) Notice: Subject to any disclaimer, the term of this patent is extended or adjusted under 35 U.S.C. 154(b) by 118 days.

(21) Appl. No.: 13/827,828

(22) Filed: Mar. 14, 2013

(65) Prior Publication Data

US 2014/0265154 A1 Sep. 18, 2014

(51) Int. Cl.
*F02F 11/00* (2006.01)
*F16J 15/08* (2006.01)

(52) U.S. Cl.
CPC ...... *F16J 15/0825* (2013.01); *F16J 2015/085* (2013.01); *F16J 2015/0862* (2013.01)

(58) Field of Classification Search
CPC  F16J 15/02; F16J 15/061; F16J 15/062; F16J 15/104; F16J 15/0825; F16J 2015/085; F16J 2015/0862
USPC ........................................ 277/590, 594, 595
See application file for complete search history.

(56) References Cited

U.S. PATENT DOCUMENTS

| | | | |
|---|---|---|---|
| 5,427,388 A | 6/1995 | Ueta | |
| 5,544,899 A | 8/1996 | Ueta | |
| 5,628,518 A * | 5/1997 | Ushio et al. | 277/593 |
| 5,979,906 A | 11/1999 | Silvian | |
| 6,431,554 B1 * | 8/2002 | Miyamoto | F16J 15/0825 277/593 |
| 6,631,909 B2 | 10/2003 | Hegmann | |
| 6,641,142 B2 | 11/2003 | Hegmann | |
| 6,688,606 B2 | 2/2004 | Hohe et al. | |
| 6,736,405 B2 | 5/2004 | Hilgert | |
| 6,786,490 B2 | 9/2004 | Fujino et al. | |
| 6,918,597 B2 | 7/2005 | Egloff | |
| 7,000,924 B2 | 2/2006 | Hohe et al. | |
| 7,665,741 B2 | 2/2010 | Imai | |
| 7,753,378 B2 | 7/2010 | Kinoshita et al. | |

(Continued)

FOREIGN PATENT DOCUMENTS

| | | |
|---|---|---|
| EP | 0574166 A1 | 12/1993 |
| EP | 1094258 A2 | 4/2001 |

(Continued)

OTHER PUBLICATIONS

PCT patent application No. WO/200270886.
International search report dated May 16, 2014 (PCT/US2014/019713).

*Primary Examiner* — Nathan Cumar
(74) *Attorney, Agent, or Firm* — Robert L. Stearns; Dickinson Wright, PLLC

(57) ABSTRACT

A multi-layer gasket for establishing a seal between a first member (such as a cylinder head) and a second member (such as an engine block) is provided. The multi-layer gasket includes a pair of outer functional layers and at least one inner functional layer. Each layer has a full combustion bead that encircles an opening, and the full combustion beads of all of the layers are aligned radially with one another. Each layer also has an outer periphery, and the outer periphery of the inner layer is disposed radially between the aligned full combustion beads and the outer peripheries of the outer layers. The outer layers also include half beads adjacent their outer peripheries.

7 Claims, 3 Drawing Sheets

(56) References Cited

U.S. PATENT DOCUMENTS

| | | | |
|---|---|---|---|
| 7,815,197 B2 | 10/2010 | Ueta | |
| 7,913,386 B2 | 3/2011 | Werz et al. | |
| 8,100,411 B2 | 1/2012 | Schumacher et al. | |
| 8,123,230 B2 | 2/2012 | Yoshijima et al. | |
| 8,556,272 B2* | 10/2013 | Okano et al. | 277/593 |
| 2005/0189724 A1* | 9/2005 | Schmitz | F16J 15/0825 277/592 |
| 2009/0184478 A1* | 7/2009 | Imai | 277/593 |
| 2009/0189359 A1* | 7/2009 | Yoshijima et al. | 277/591 |
| 2009/0267308 A1* | 10/2009 | Schmucker | F16J 15/0825 277/592 |
| 2011/0127729 A1* | 6/2011 | Takeda et al. | 277/592 |
| 2011/0192369 A1* | 8/2011 | Schmitz | 123/193.1 |

FOREIGN PATENT DOCUMENTS

| | | |
|---|---|---|
| EP | 1795785 A1 | 6/2007 |
| GB | 2206656 A | 1/1989 |
| JP | 05087246 A | 4/1993 |
| JP | 2000028001 A | 1/2000 |
| JP | 2007064449 A | 3/2007 |
| JP | 2008163921 A | 7/2008 |
| WO | 9308420 A1 | 4/1993 |

* cited by examiner

MULTI-LAYER GASKET

BACKGROUND OF THE INVENTION

1. Field of the Invention

The present invention relates generally to gaskets of the type used to establish gas and fluid tight seals between two members to be clamped together.

2. Related Art

In establishing a gas tight seal between two members to be clamped together, such as a cylinder head and an engine block, it is common to use a cylinder head gasket having one or more layers. Generally, at least one of the layer(s), sometimes referred to as a functional layer, has a combustion bead which deforms elastically when sandwiched between the cylinder head and engine block to establish the gas tight seal. This gas tight seal must be maintained even during relative movement of the members being sealed, e.g. lifting of the cylinder head away from the engine block during operation of the engine. One approach gasket manufactures have taken is to increase the thickness of the gasket in certain locations, thereby increasing the biasing force by the combustion bead against the engine block or cylinder head. Another approach some gasket manufactures have taken is to include one or more compression limiters adjacent the combustion beads of their gaskets. In operation, the compression limiters prevent full flattening of the combustion bead between the cylinder head and the engine block.

SUMMARY OF THE INVENTION

An aspect of the present invention provides for a multi-layer metal gasket for establishing a seal between a first member and a second member. The multi-layer gasket includes a pair of outer functional layers, each of which has an outer layer outer periphery and an inner periphery that surrounds an opening. Each of the outer functional layers has an outer layer full combustion bead which is spaced radially from and circumferentially surrounds the opening. Each of the outer functional layers also has a second bead spaced between the outer layer full combustion bead and the outer layer outer periphery. At least one inner functional layer is sandwiched between the outer functional layers and includes an inner layer full combustion bead aligned radially with the outer layer full combustion beads for improving the seal between the first and second members. The inner functional layer has an inner layer outer periphery that is spaced between the aligned full combustion beads and the second beads of the outer functional layers.

The multi-layer gasket is advantageous because it establishes a gas tight seal between the first and second members, which could be, for example, a cylinder head and an engine block of an internal combustion engine. The gas tight seal is very strong and durable because of the alignment of the combustion beads on the outer and inner functional layers and is maintained even if the members move relative to one another, e.g. lifting of the cylinder head off of the engine block. This improved gas and fluid tight seal may be achieved at a very low cost because the multi-layer gasket lacks a distance layer or a stopper feature, as are common in other known gaskets, and because the inner functional layer is dimensionally smaller than the outer functional layers.

BRIEF DESCRIPTION OF THE DRAWINGS

These and other features and advantages of the present invention will be readily appreciated, as the same becomes better understood by reference to the following detailed description when considered in connection with the accompanying drawings wherein.

DESCRIPTION OF THE ENABLING EMBODIMENT

Figure 1:
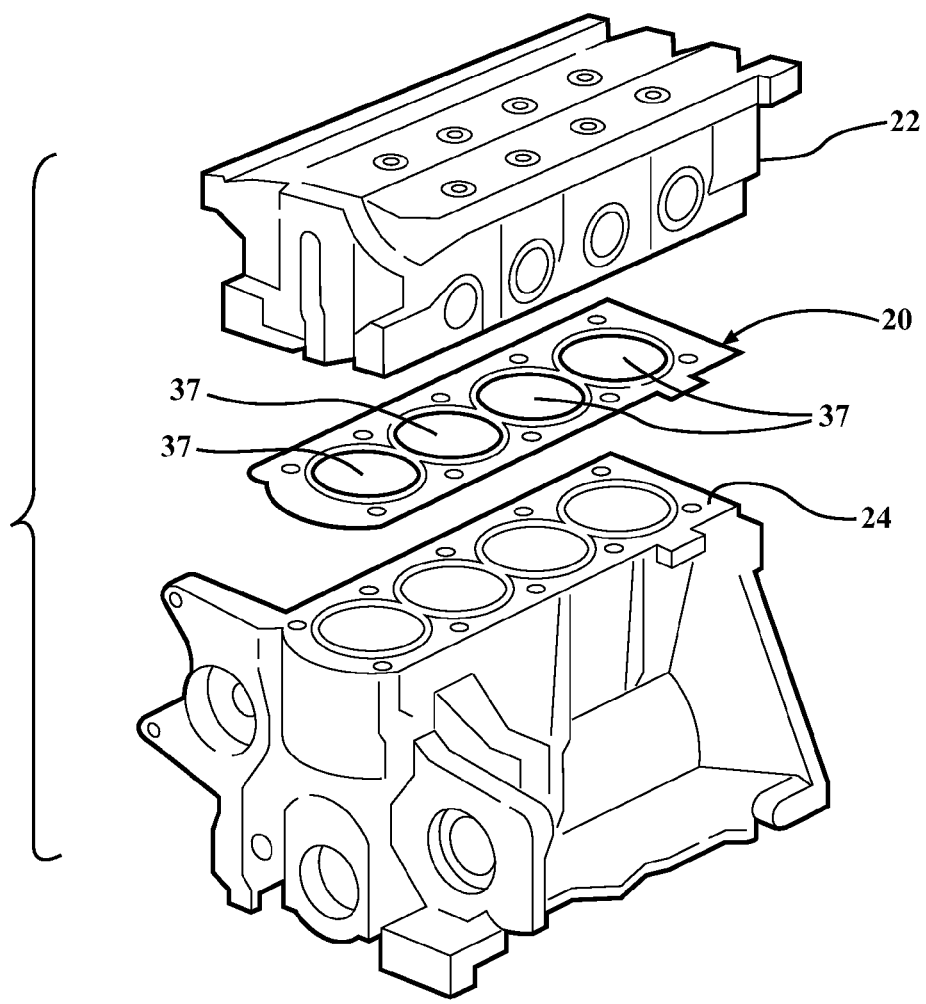
FIG. 1 is a partially exploded view of an internal combustion engine with an exemplary multi-layer metal gasket disposed between a cylinder head and an engine block.

Referring to the Figures, wherein like numerals indicate corresponding parts throughout the several views, an exemplary embodiment of a multi-layer metal gasket 20 for establishing a seal between a first member and a second member is generally shown in FIG. 1. In the first exemplary embodiment, the multi-layer gasket 20 is a cylinder head gasket 20 configured to establish a gas tight seal between a cylinder head 22 and an engine block 24 of an internal combustion engine, thereby sealing combustion gasses within a plurality of combustion chambers during operation of the engine. The exemplary multi-layer gasket 20 is configured to maintain this seal during the operation of the engine when the cylinder head 22 may lift off of the engine block 24 in response to a fuel and air combustion within one or more of the combustion chambers. However, it should be appreciated that the multi-layer metal gasket 20 could find uses in a range of other vehicular or non-vehicular applications, i.e. the gasket 20 could be employed to seal any desirable types of first and second members. For example, the gasket 20 could alternately configured to seal an exhaust manifold (not shown) to the engine block 24.

Figure 2:
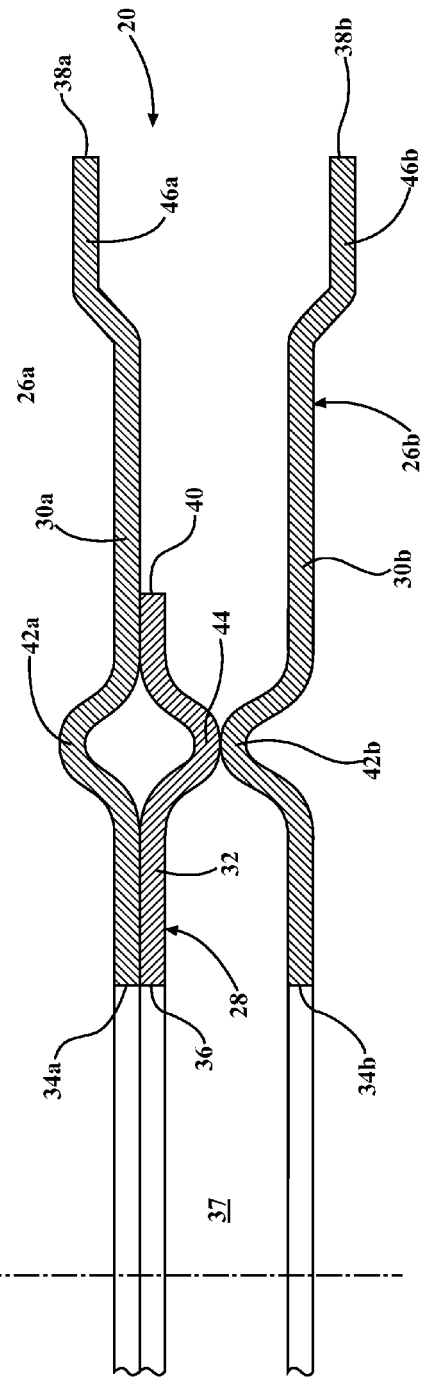
FIG. 2 is a cross-sectional and fragmentary view of an exemplary embodiment of the multi-layer metal gasket in an uncompressed condition.

Referring now to the cross-sectional view of FIG. 2, the exemplary gasket 20 includes three functional layers 26*a*, 26*b*, 28 which are stacked one on top of another. Specifically, the multi-layer gasket 20 of the first exemplary embodiment includes a first outer functional layer 26*a*, a second outer functional layer 26*b* and a single inner functional layer 28. Although only one is included in the first exemplary embodiment, it should be appreciated that the multi-layer gasket 20 could alternately include two or more inner functional layers, if desired. Unlike many conventional gaskets, the exemplary multi-layer metal gasket 20 does not include any distance layers or stopper features between the outer functional layers 26*a*, 26*b*.

Each of the functional layers 26*a*, 26*b*, 28 has a generally planar body portion 30*a*, 30*b*, 32 which has a generally uniform thickness and an inner periphery 34*a*, 34*b*, 36 that surrounds an opening 37. As shown in FIG. 1, the multi-layer gasket 20 of the first exemplary embodiment includes a plurality of openings 37 which correspond with combustion openings in the cylinder head 22 and engine block 24 of the internal combustion engine. However, it should be appreciated that the openings could correspond with any desirable features. Referring back to FIG. 2, each of the functional layers 26*a*, 26*b*, 28 extends radially outwardly from its respective inner periphery 34*a*, 34*b*, 36 to an outer periphery 38a, 38b, 40. Specifically, the outer functional layers 26a, 26b extend to first outer peripheries 38a, 38b, and the inner functional layer 28 extends to a different second outer periphery 40. As shown, the inner functional layer 28 is relatively smaller than either of the outer functional layers 26a, 26b, which are sized similarly to one another. The inner peripheries 34a, 34b, 36 are generally aligned with one another.

Figure 3:
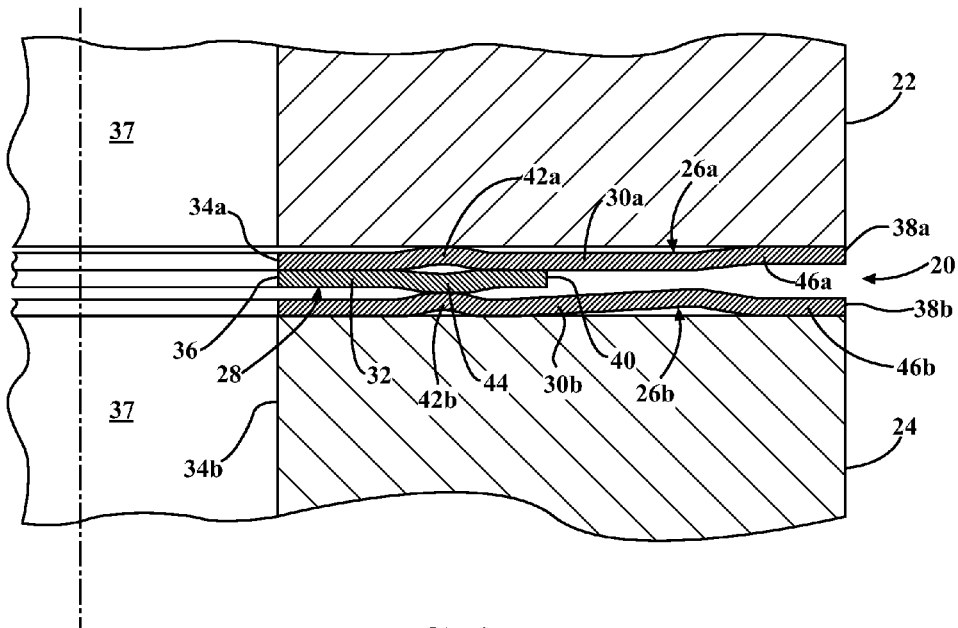
FIG. 3 is a cross-sectional and fragmentary view of the exemplary embodiment of the multi-layer metal gasket in a compressed condition between the cylinder head and the engine block.

Each of the functional layers 26a, 26b, 28 also includes a full combustion bead 42a, 42b, 44 which encircles (or circumferentially surrounds) the openings 37 of the respective layers 26a, 26b, 28. Specifically, the outer functional layers 26a, 26b include outer layer full combustion beads 42a, 42b, and the inner functional layer 28 includes an inner layer full combustion bead 44. The full combustion beads 42a, 42b, 44 are formed integrally with the generally planar body portions 30a, 30b, 32 of the respective functional layers 26a, 26b, 28 and are spaced radially from the inner peripheries 34a, 34b, 36. As shown in FIG. 2, when viewed in cross-section, each full combustion bead 42a, 42b, 44 is generally semi-circular in shape and has a crest which is axially offset from the planar body portion 30a, 30b, 32 of the associated functional layer 26a, 26b, 28. As best shown in FIG. 3, the full combustion beads 42a, 42b, 44 are configured to deflect elastically when the cylinder head 22 is clamped onto the engine block 24 with the multi-layer gasket 20 sandwiched therebetween to maintain the gas tight seal even when the cylinder head 22 lifts off of the engine block 24 during operation of the engine.

In the exemplary embodiment, all three of the full combustion beads 42a, 42b, 44 are aligned radially with one another. As such, when the cylinder head 22 is clamped onto the engine block 24, an increased load is exerted by the multi-layer gasket 20 onto the cylinder head 22 and the engine block 24 at the location of the full combustion beads 42a, 42b, 44. This provides the multi-layer gasket 20 with an improved, more durable and more reliable gas-tight seal during operation of the engine to maintain the combustion gasses within the combustion chambers of the engine.

In the first exemplary embodiment, the outer layer full combustion beads 42a, 42b of the outer functional layers 26a, 26b extend in the same axial direction (upwardly), and the inner layer full combustion bead 44 of the inner functional layer 28 extends in an opposite axial direction (downwardly). The inner layer full combustion bead 44 extends axially towards the outer layer full combustion beads 42b of the second outer functional layer 26b so that the crests of these combustion beads 42b, 44 are in sealing engagement with one another. Referring now FIG. 3, when the multi-layer gasket 20 of the exemplary embodiment is sandwiched between an engine block 24 and a cylinder head 22, the full combustion bead 44 of the inner functional layer 28 and the outer layer full combustion bead 42b are biased and pressed against one another, and the outer layer full combustion bead 42a of the first outer functional layer 26a is biased and pressed against a lower surface of the cylinder head 22. Elastic deformation of the full combustion beads 42a, 42b, 44 allows the gas tight seal to be maintained during operation of the internal combustion engine when the cylinder head 22 lifts away from the engine block 24 slightly in response to combustion in the combustion chamber.

Referring back to FIG. 2, each of the outer functional layers 26a, 26b additionally includes a half bead 46a, 46b spaced from its respective outer layer full combustion bead 42a, 42b opposite of the opening 37, i.e. the outer layer full combustion beads 42a, 42b are disposed between the opening 37 and the half beads 46a, 46b. That is, the first outer functional layer 26a has a first half bead 46a, and the second outer functional layer 26b has a second half bead 46b. In operation, the half beads 46a, 46b provide a fluid tight seal for fluid channels in the cylinder head 22 (shown in FIG. 1) and the engine block 24 (also shown in FIG. 1). The outer periphery 40 of the inner functional layer 28 is spaced between the aligned full combustion beads 42a, 42b, 44 and the first outer peripheries 38a, 38b of the outer functional layers 26a, 26b. Each half bead 46a, 46b is formed integrally with the generally planar body portion 30a, 30b of the respective outer functional layers 26a, 26b and is stepped relative to its respective generally planar body portion 30a, 30b in an axial direction, i.e. upwardly or downwardly. As shown, the half beads 46a, 46b of the outer functional layers 26a, 26b extend in opposite axial directions from one another. As best shown in FIG. 3, when the metal gasket 20 is sandwiched between the cylinder head 22 and engine block 24, the half beads 46a, 46b deflect elastically to establish the fluid tight seal between the cylinder head 22 and the engine block 24. As shown, the half beads 46a, 46b are disposed adjacent the outer peripheries 38a, 38b of the outer functional layers 26a, 26b, and the outer periphery 40 of the inner functional layer 28 is spaced between the aligned full combustion beads 42a, 42b, 44 and the half beads 46a, 46b.

The outer and inner functional layers 26a, 26b, 28 are preferably formed of steel but could alternately be formed of any desirable metal or combination of metals. The three (or more) functional layers 26a, 26b, 28 could all be formed of the same metal or could be formed of different materials. The full combustion beads 42a, 42b, 44 and the half beads 46a, 46b are preferably formed into their respective functional layers 26a, 26b, 28 through a stamping or pressing operation but could alternately be formed through any suitable process.

Figure 4:
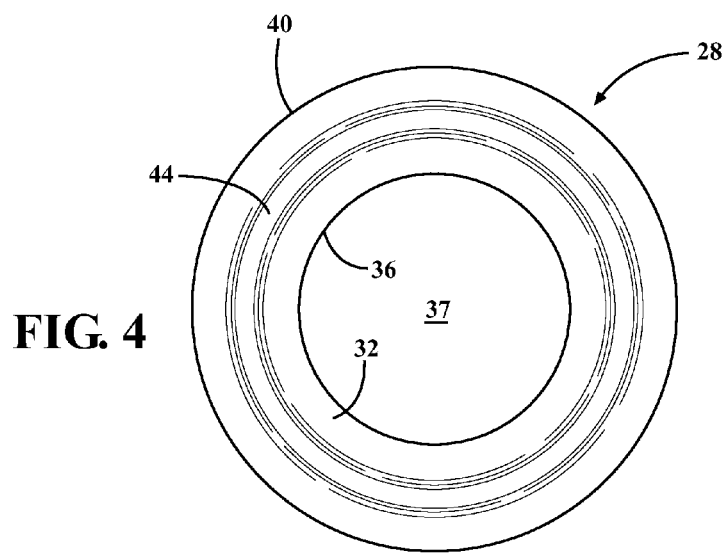
FIG. 4 is a bottom view of an inner functional layer of the exemplary embodiment of the multi-layer metal gasket.

As shown in FIG. 4, the first exemplary embodiment of the inner functional layer 28 is generally annularly shaped. As such, it is much smaller than the outer functional layers 26a, 26b (shown in FIG. 2) and is only large enough to perform its intended function, i.e. improving the gas tight seal around the opening 37. As such, the inner functional layer 28 may be formed very quickly and cheaply and with minimal material costs. If desired, the multi-layer gasket 20 may be heat treated after the beads are formed.

Figure 5:
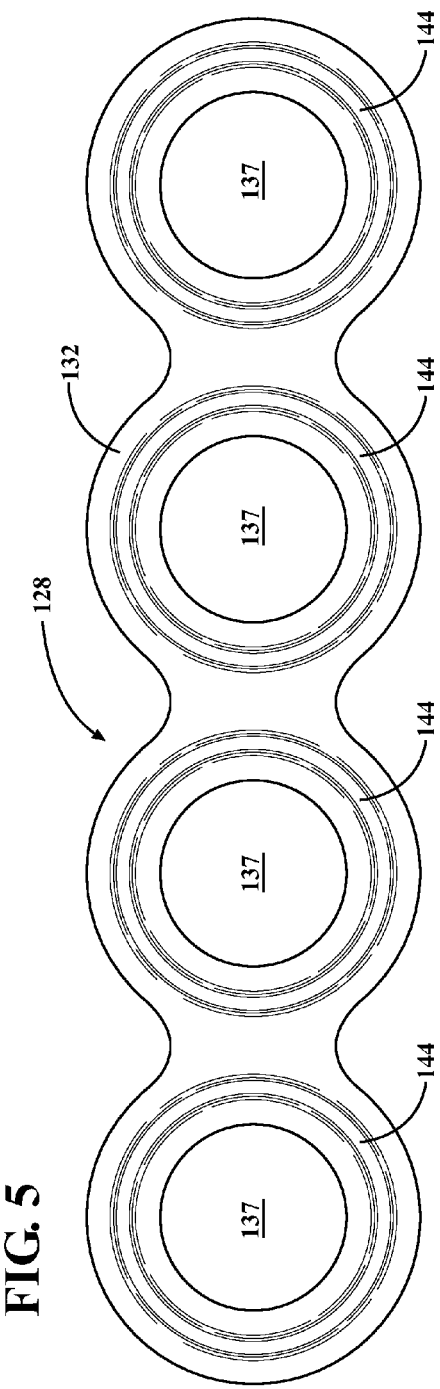
FIG. 5 is a bottom view of an alternate embodiment of the inner functional layer.

Referring now to FIG. 5, a second exemplary embodiment of the inner functional layer 128 is shown. This embodiment includes one generally planar body portion 132 with a plurality of full embossment beads 144 which encircle a plurality of openings 137 which could correspond to, for example, a plurality of combustion openings in an internal combustion engine. Alternately, the inner functional layer could have a single elongated full embossment bead which encircles all of the openings.

Obviously, many modifications and variations of the present invention are possible in light of the above teachings and may be practiced otherwise than as specifically described while within the scope of the appended claims.

What is claimed is:

1. A multi-layer metal gasket for establishing a seal between a first member and a second member, comprising:
    a pair of outer functional layers, each of said outer functional layers having an outer layer outer periphery and an inner periphery surrounding an opening, each of said outer functional layers having an outer layer full combustion bead spaced radially from and circumferentially surrounding said opening, each of said outer functional layers having a half bead spaced radially from said full compression bead, and said outer layer full combustion beads extending in a first axial direction;

at least one inner functional layer sandwiched between said outer functional layers, said inner functional layer including an inner layer full combustion bead aligned radially with said outer layer full combustion beads, and said inner functional layer having an inner periphery surrounding said opening and aligned with said inner peripheries of said outer functional layers, said at least one inner functional layer extending radially inwardly of said inner layer full combustion bead and terminating at an outer periphery thereof that is located radially between said aligned full combustion beads and said half beads of said outer functional layers; and said inner layer full combustion bead extending in an opposite second axial direction from that of said first axial direction of said outer layer full combustion beads and being disposed in peak to peak contact with one of said outer layer full combustion beads and being compressible to establish a fluid tight seal against the one of said outer layer full combustion beads in peak to peak contact therewith.

2. The multi-layer metal gasket as set forth in claim 1 wherein said half beads on said outer functional layers are disposed adjacent said outer layer outer peripheries.

3. The multi-layer metal gasket as set forth in claim 1 wherein said half beads of said outer functional layers extend outwardly in opposite axial directions from one another.

4. The multi-layer metal gasket as set forth in claim 1 wherein said inner functional layer is generally annularly shaped.

5. A multi-layer metal gasket for establishing a seal between a first member and a second member, comprising:
 a first outer functional layer having a first inner periphery surrounding an opening, a first outer layer full combustion bead spaced radially from said first inner periphery, a first outer periphery spaced radially from said first outer layer full combustion bead, and a first half bead adjacent said first outer periphery;

a second outer functional layer having a second inner periphery surrounding said opening, a second outer layer full combustion bead spaced radially from said second inner periphery and aligned with said first outer layer full combustion bead, said outer layer full combustion bead a said second outer function layer extending in a first axial direction and said first outer layer full combustion bead of said first outer functional layer also extending in said first axial direction, a second outer periphery spaced radially from said second outer layer full combustion bead and a second half bead adjacent said second outer periphery and aligned with said first half bead;

at least one inner functional layer sandwiched between said first and second outer functional layers, said at least one inner functional layer having an inner layer full combustion bead aligned radially with said outer layer full combustion beads, and said inner functional layer extending radially and terminating radially between said aligned full combustion beads and said aligned half beads of said first and second outer functional layers; and wherein said inner layer full combustion bead extends in an opposite axial direction from said first and second outer layer full combustion beads and is in peak to peak contact with one of said second outer layer full combustion beads and is compressible to establish a fluid tight seal against said second outer layer full combustion bead.

6. The multi-layer metal gasket as set forth in claim 5 wherein said half beads of said first and second outer functional layers extend in opposite axial direction.

7. The multi-layer metal gasket of claim 1, wherein said at least one inner function layer is disposed in surface-to-surface contact with the other of said outer functional layer in which there is said peak-to-peak contact, said surface-to-surface contact being on radially opposite sides of said full beads of each said other outer functional layer and said inner functional layer.

* * * * *